June 17, 1924.

B. TUNE ET AL 1,498,493

EXTENSION CAR STEP

Filed Oct. 29, 1923  2 Sheets-Sheet 1

B. Tune
L. West
INVENTOR

BY *Victor J. Evans*
ATTORNEY

WITNESS:

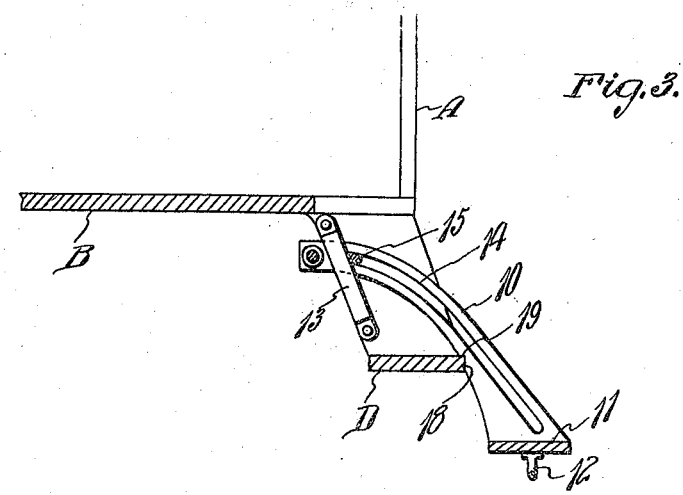
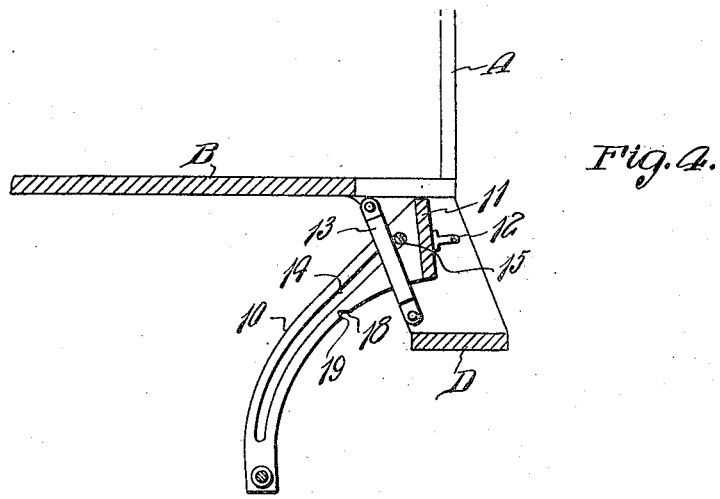
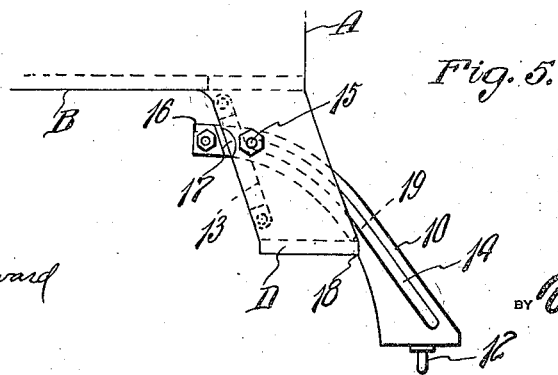

Patented June 17, 1924.

1,498,493

UNITED STATES PATENT OFFICE.

BILL TUNE AND L. WEST, OF CARBON HILL, ALABAMA.

EXTENSION CAR STEP.

Application filed October 29, 1923. Serial No. 671,518.

*To all whom it may concern:*

Be it known that we, BILL TUNE and L. WEST, citizens of the United States, residing at Carbon Hill, in the county of Walker and State of Alabama, have invented new and useful Improvements in Extension Car Steps, of which the following is a specification.

This invention relates to railroad or other cars and has for its object the provision of a novel extension step movably mounted on the ordinary steps and adapted to be extended into operative position so as to make it easier for passengers to get on and off the train or car.

An important object is the provision of a device of this character which entirely eliminates the use of the little stools commonly provided and set on the station platform below the ordinary car steps for the purpose of assisting the passengers.

Another object is the provision of a device of this character which on account of its movable mounting may be slid into retracted or inoperative position when its use is not desired so as not to be in the way.

An additional object is the provision of an extension step of this character which will be simple and inexpensive in manufacture, highly efficient in use, durable in service and a general improvement in the art.

With the above and other objects and advantages in view the invention consists in the details of construction to be hereinafter more fully described and claimed and illustrated in the accompanying drawings, in which—

Figure 3 is a vertical section showing the step in extended position.

Figure 4 is a similar view but showing the step in retracted position.

Figure 5 is a side elevation showing the step in extended position.

Figure 1:
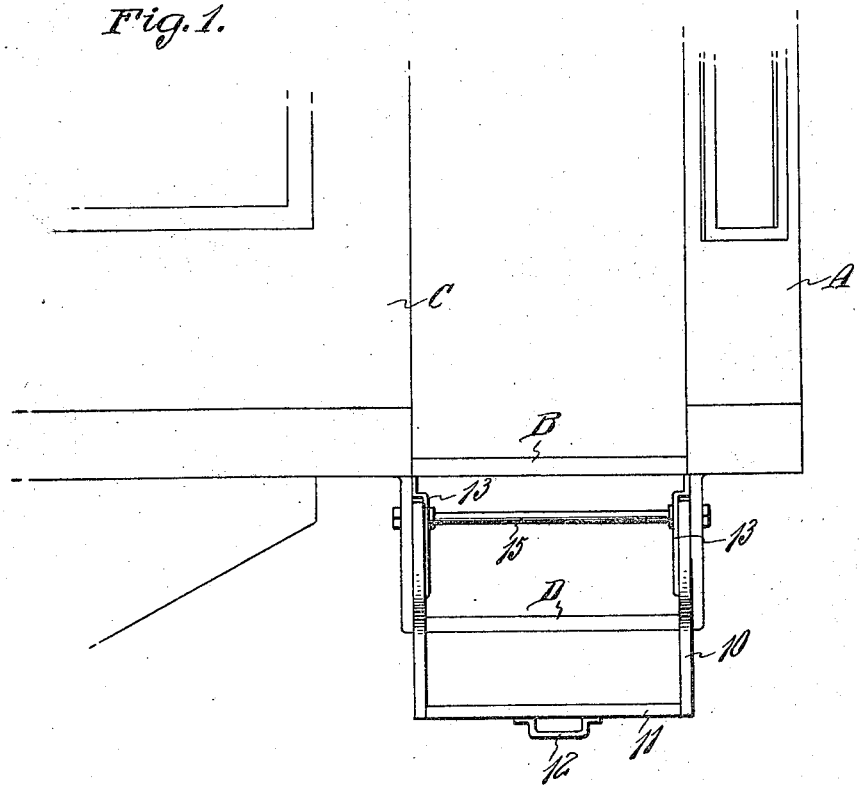
Figure 1 is an elevation of a car vestibule showing our step mounted therein and in operative position.

Referring more particularly to the drawings the letter A represents the vestibule of a car, which vestibule includes the usual floor B, sides C and steps D. The vestibule construction forms no part of the present invention but is illustrated as being necessary to a proper understanding thereof.

In carrying out our invention we provide an extension step structure which includes a pair of elongated arcuate arms 10 connected at their lower ends by a step 11 which is provided on its underside with a handle 12 for facilitating its movement from inoperative to operative position and vice versa. The arms 10 are slidably mounted within guides 13 secured upon the sides C of the vestibule, and extending through these sides and through arcuate slots 14 in the arms are pivot bolts 15.

Forward and downward sliding movement of the arms into operative position is limited by brackets 16 which are secured upon the opposite sides of the rear ends of the arms and which engage against stops 17 on the sides of the vestibule. To brace the structure when in extended position, the lower edges of the arms are formed with notches 18 which define shoulders 19 resting upon the lowermost step of the vestibule when the extension step is in its operative position.

Figure 2:
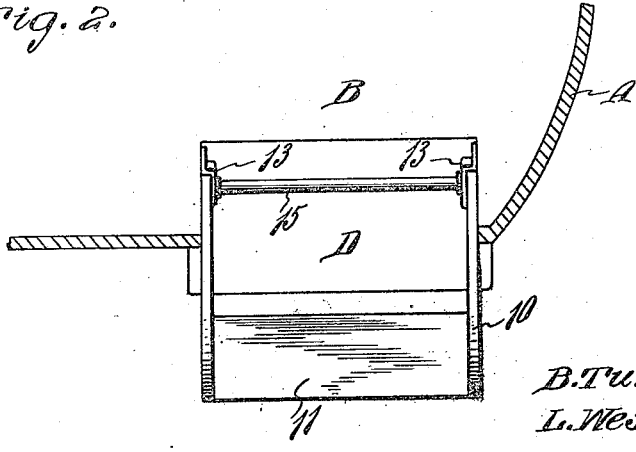
Figure 2 is a horizontal section through the vestibule showing a plan view of the step in extended position.

When the car is in motion the step is pushed up into its inoperative position as shown in Figure 4 whereupon it does not project out. When the car stops and passengers are supposed to get on or off, it is merely necessary for the porter or other attendant to grasp the handle 12 and pull downwardly and outwardly whereupon the step will be extended into the operative position shown in Figures 1, 2 and 3.

From the foregoing description and a study of the drawings it will be apparent that we have thus provided a simply constructed and inexpensive extension step which is very convenient, which reduces danger of accident and which avoids use of the little and well known stools ordinarily used. As there is so few parts it is apparent that there is little to get out of order so that the device should have a long life and satisfactorily perform all of its functions.

While we have shown and described the preferred embodiment of our invention it is of course to be understood that we reserve the right to make such changes in the form, construction and arrangement of parts as will not depart from the spirit of the invention or the scope of the subjoined claims.

Having thus described our invention we claim:

1. An extension step attachment for car vestibules, comprising brackets mounted on the sides of the vestibule, arms slidably engaged through said brackets, an extension step carried by the lower ends of the arms, said step being movable into operative or inoperative position, means for guiding the arms during their movement, said arms being formed with curved slots, and pivot bolts extending through said slots and the sides of the vestibule.

2. An extension step structure for car vestibules, comprising a pair of brackets mounted on the sides of the vestibule, a pair of elongated curved arms slidably engaged through said brackets, a step connecting the lower ends of said arms, guides on the sides of the vestibule engaging the arms for insuring proper movement thereof, the lower edges of the arms being formed with stop shoulders engageable upon the edge of the lowermost step of the vestibule.

3. An extension step structure for car vestibules, comprising a pair of brackets mounted on the sides of the vestibule, a pair of elongated curved arms slidably engaged through said brackets, a step connecting the lower ends of said arms, guides on the sides of the vestibule engaging the arms for insuring proper movement thereof, the lower edges of the arms being formed with stop shoulders engageable upon the edge of the lowermost step of the vestibule, and brackets on the rear ends of said arms engageable with stops on the vestibule sides for limiting the movement of the arms.

In testimony whereof we affix our signatures.

BILL TUNE.
L. WEST.